United States Patent [19]
Makino

[11] Patent Number: 6,023,596
[45] Date of Patent: *Feb. 8, 2000

[54] DRIVING APPARATUS FOR IMAGE CARRYING MEMBER

[75] Inventor: Toru Makino, Hachioji, Japan

[73] Assignee: Konica Corporation, Tokyo, Japan

[*] Notice: This patent is subject to a terminal disclaimer.

[21] Appl. No.: 09/152,803

[22] Filed: Sep. 14, 1998

[30]    Foreign Application Priority Data

Sep. 17, 1997  [JP]  Japan .................................. 9-252072

[51] Int. Cl.⁷ .................................................. G03G 15/00
[52] U.S. Cl. ................................................................ 399/167
[58] Field of Search ............................... 399/167, 75, 159, 399/162; 74/411, 574

[56]    References Cited

U.S. PATENT DOCUMENTS 5,371,576  12/1994  Gonda ....................................... 399/167
5,881,342   3/1999  Makino et al. ........................... 399/167

FOREIGN PATENT DOCUMENTS

| 0 586 869 | 3/1994 | European Pat. Off. . |
| 0 867 777 | 9/1998 | European Pat. Off. . |
| 2-199464 | 8/1990 | Japan . |
| 4-264457 | 9/1992 | Japan . |
| 4-360158 | 12/1992 | Japan . |
| 7-140842 | 6/1995 | Japan . |
| 7-325445 | 12/1995 | Japan . |
| 7-325446 | 12/1995 | Japan . |
| 9-303413 | 11/1997 | Japan . |

*Primary Examiner*—Joan Pendegrass
*Attorney, Agent, or Firm*—Frishauf, Holtz, Goodman, Langer & Chick, P.C.

[57]    ABSTRACT

In a driving apparatus to transmit driving power to an image carrying member in an image forming apparatus, provided with a driving gear and a flywheel coupled with the image carrying member, there are further provided with a rigid protrusion fixed on one of the driving gear and the flywheel; and an elastic member fixed on the other one of the driving gear and the flywheel, the elastic member is shaped so as to engage with the rigid protrusion and includes a first member provided in contact with the rigid protrusion at the engaging portion for elastically deforming itself so as to control a natural frequency value of a driving system including said rotating body, and a second member for controlling damping characteristics of said driving system.

10 Claims, 12 Drawing Sheets

ENGAGING DIRECTION →

DRIVING APPARATUS FOR IMAGE CARRYING MEMBER

BACKGROUND OF THE INVENTION

The present invention relates to a driving apparatus for an image carrying member in an image forming apparatus to conduct image formation on the image carrying member by an electrophotographic method.

In an electrophotographic copying machine or printer, an electrostatic latent image is formed on the surface of a rotating cylindrical photoreceptor or of a running belt-shaped photoreceptor, then, the formed electrostatic latent image is developed with toner, and the toner image thus developed is transferred onto and fixed on a recording sheet to obtain an image.

When there is caused speed fluctuation (speed irregularities) on a photoreceptor drum or a belt-shaped photoreceptor which is supposed to rotate at a constant speed, small pich banding phenomenon takes place, and the jitters and image irregularities are caused on the outputted image. This appears especially conspicuously in an electrophotographic technology of a digital system wherein writing on a photoreceptor is conducted through scanning by a semiconductor laser, and speed variation in the sub-scanning direction in the writing system is caused by the speed variation of rotation of the photoreceptor, causing delicate deviation of writing lines in their intervals, resulting in a factor to lower image quality sharply.

With regard to technologies for improving accuracy in driving a photoreceptor drum or a belt-shaped photoreceptor which is supposed to rotate at a constant speed, there are many proposals which are roughly divided into the following two categories.

One of the two categories is one wherein a flywheel is incorporated in the driving system, and TOKKAIHEI Nos. 7-281500 and 8-202205 disclose those wherein a conventional flywheel is easily mounted or dismounted. Further, TOKKAIHEI Nos. 6-130872, 6-130874, 7-302025 and 8-202206 disclose technologies wherein a flywheel is provided in a rotational body. In addition, TOKKAIHEI Nos. 8-63041, 8-115041, and 8-220966 disclose technologies wherein frequency characteristics of a rotational body are detected and thereby, moment of inertia of a flywheel is normalized in connection with shaking frequency.

The other of the two categories is one wherein vibration in the rotational direction of the drive transmitting system is absorbed by using gears and timing belt pulleys in which elastic members are provided on the half way of the rotational body driving system. Concrete examples are shown in TOKKAIHEI Nos. 6-249321, 6-294453, 7-325445, 7-325446 and 8-54047.

As stated above, in prior art, use of a flywheel has been the most effective technical means for improving accuracy in driving a photoreceptor drum or a belt-shaped photoreceptor, but there has been a theoretical problem that a large apparatus is required and large torque is also required in the rise of rotation. Further, since the flywheel itself is one to reduce rotational vibration by its rotational kinetic energy, when obtaining its effect in the case of low speed rotation of a rotational body, it is necessary to use a flywheel having a larger diameter compared with the rotational body. Therefore, for the purpose of avoiding a large-sized apparatus, one has had to be contented with a functional limit even when providing a flywheel in the rotational body.

It has become popular recently to obtain a natural frequency of a driving system for a rotational body and thereby to design the driving system taking the relation with shaking frequency into consideration, and to obtain frequency response of a rotational system focusing on a natural frequency and thereby to change a form of frequency characteristics, namely a form of transfer functions by the design of inertial quantity to change the peak position so that the driving system may be optimum. The most serious problem in this case is that a diameter of the flywheel is required to be large or the flywheel is required to be heavy in weight, naturally in the case of a single rotational body driving system, when considering to move a natural frequency to a low frequency area. This means that, when natural frequency f of basic frequency is represented by $$f = \frac{1}{2\pi}\sqrt{\frac{K}{I}}$$

the value of natural frequency f is made small by making moment of inertia I to be large.

On the other hand, improving the driving accuracy by providing elastic members on the half way of the driving system means that a vibration component in the rotational direction generated in the driving system is converted into heat in the elastic members to be diffused. Since there are no concepts of frequency characteristics and transfer function in this case, effects of the elastic members can not be predicted depending upon shaking frequency of the generated vibration and the structure of the driving system, resulting in different levels of effects.

However, in development of an image forming apparatus of a digital system, reproducibility of one dot line by laser writing is required strictly as performances are improved and accuracy required for the driving system has become strict rapidly. The accuracy required in this case is on the level wherein uniformity of laser writing in the sub-scanning direction can be guaranteed in connection with visual sensitivity of a visual system, and with the trend of high density recording such as 600 dpi to 2400 dpi, there is required highly accurate driving of a rotational body having no speed fluctuation and satisfying a high level in which a human being can not recognize small pich banding.

For the reasons mentioned above, there are generally employed highly accurate gears, exclusive driving, and a large-sized flywheel in the scope of prior art. However, when employing a flywheel, there is no way to avoid heavy weight and a large apparatus. For providing a printer of an electrophotographic system, too, there has been proposed a structure to transmit gear driving force to a rotational body such as a photoreceptor drum through elastic members because of necessity to materialize the highly accurate driving structure which is light in weight, compact in size and low in cost. However, this technology which employs only elastic members has had a problem that a gain in a resonance area is large, and speed fluctuation in the vicinity of the resonance area and load variation adversely affect to a great extent to worsen the banding although the technology has shown great effects to reduce speed fluctuation which is higher than a natural frequency.

SUMMARY OF THE INVENTION

An object of the present invention is, with a novel structure to solve those problems, to provide an image carrying member driving apparatus which works effectively for a small diameter photoreceptor drum or for a small diameter roller to drive a belt-shaped photoreceptor, is light in weight, compact in size, low in cost and is hardly affected adversely by an external disturbance, and thereby attaining highly accurate driving and outputting images with high image quality.

The above object of the invention is attained by the following driving apparatus for an image carrying member.

In an image carrying member driving apparatus to transmit driving power of driving gears to a photoreceptor drum or a belt-shaped photoreceptor driving roller, the image carrying member driving apparatus comprises

- a protrusion of a rigid member fixed on the driving gear;
- a flywheel having an end face opposite to the driving gear;
- a first elastic member fixed on the end face of the flywheel and to transmit driving power from the driving gear to the flywheel by coming in contact with the protrusion; and
- a second elastic member fixed on an end face of the image carrying member and to work for an elastic action of the first elastic member caused by the contact between the first elastic member and the protrusion.

In an image carrying member driving apparatus to transmit driving power of driving gears to a photoreceptor drum or a belt-shaped photoreceptor driving roller, the image carrying member driving apparatus comprises

- a flywheel having an end face opposite to the driving gear;
- a protrusion of a rigid member fixed on an end face of the flywheel;
- a first elastic member fixed on the driving gear and to transmit driving power from the driving gear to the flywheel by coming in contact with the protrusion; and
- a second elastic member fixed on the driving gear and to work for an elastic action of the first elastic member caused by the contact between the first elastic member and the protrusion.

BRIEF DESCRIPTION OF THE DRAWINGS

FIG. 2(a), 2(b) and 2(c) are explanatory views showing an example of an engaging member.

FIGS. 4(a), 4(b)1, 4(b)2, 4(c) and 4(d) are explanatory views showing an example of installation of a viscoelastic body in drive-transmitting section.

DETAILED DESCRIPTION OF THE INVENTION

The greatest differences between a rotational body driving apparatus of the invention stated below and that in prior art are the following two points.

Figure 12:
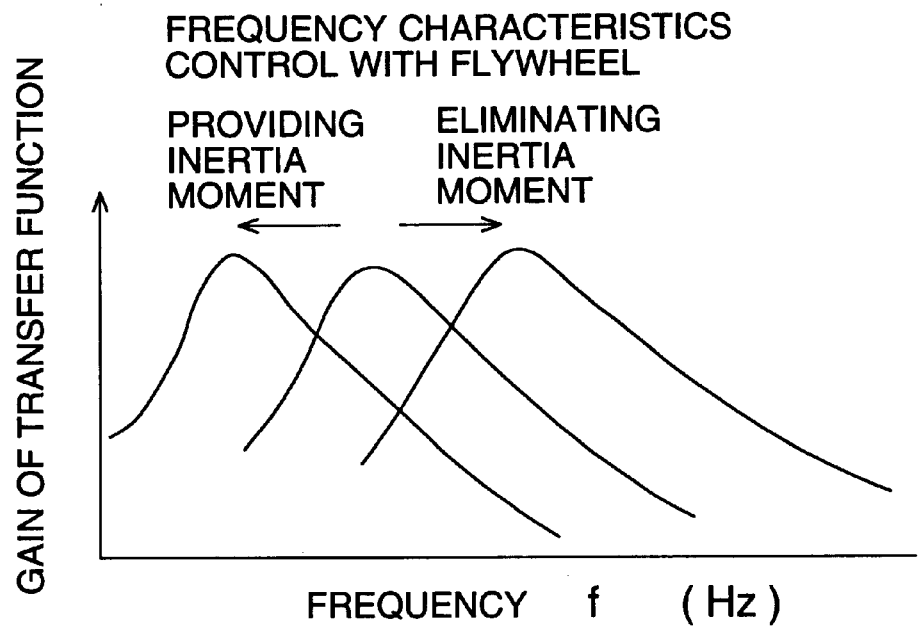
FIGS. 12(a) and 12(b) represent an illustration related to the control of frequency characteristics.
Figure 12:
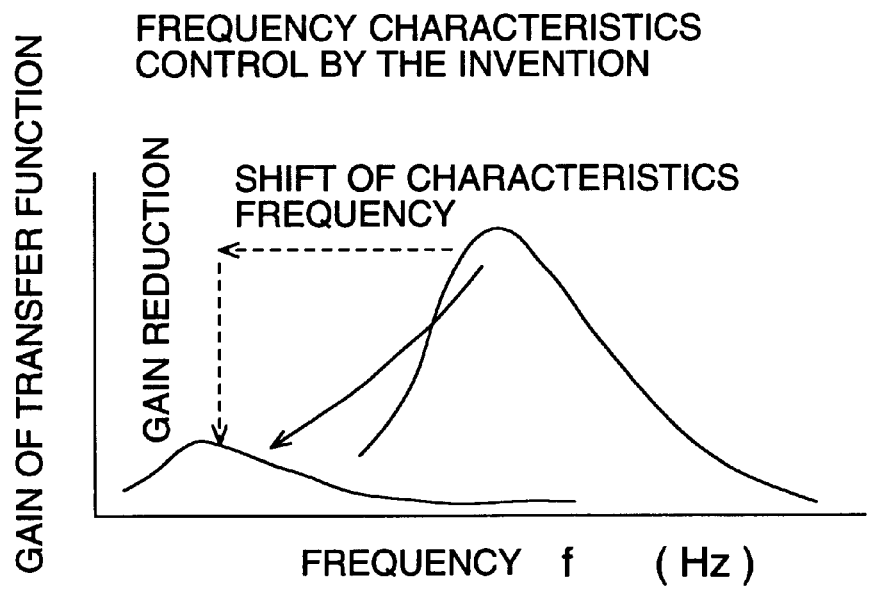

1. The invention is theoretically different from those wherein a form of a transfer function in frequency characteristics is changed by a flywheel, and it is one capable of controlling frequency characteristics with an extremely simple structure without using a flywheel. Namely, natural frequency f has been changed by changing moment of inertia I in the prior art (see FIG. 12(a)), but in the invention, frequency characteristics can be controlled by changing torsional rigidity K of a substantial driving system.

2. The invention not only can control frequency characteristics by changing the peak position of the frequency characteristic but also can reduce freely a magnitude of the frequency characteristic, namely, a level of a gain of the transfer function. This corresponds to the occasion wherein the peak of the transfer function is not only moved in parallel but also moved in the size direction so that the height of the transfer function is lowered (see FIG. 12(b)).

Owing to the foregoing, there is offered an effect that an absolute value of a vibration in the rotational direction existing in the corresponding frequency area is sharply lowered.

The above structure is effective in the case that the diameter of a photoreceptor drum or the diameter of a belt-shaped photoreceptor driving roller is relatively large and the inertia moment is approximately 10000 gcm$^2$ or more. However, in the case that the inertia moment is lower than that, that is, in the case that the diameter of a photoreceptor drum or the diameter of a belt-shaped photoreceptor driving roller is relatively small, the above structure may not perfom its effect sufficiently. Then, in the present invention, a flywheel is provided in the system of the image carrying member driving apparatus so that the sum of the inertia moment of the photoreceptor and the inertia moment of the flywheel becomes 10,000 gcm$^2$ to 30,000 gcm$^2$. Whereby, the driving with high accuracy can be attained even for the small diameter photoreceptor drum or the small diameter belt-shaped photoreceptor driving roller. Incidentally, if the driving with high accuracy as similar to the present invention is conducted only by a flywheel without following the present invention, it is necessary for the flywheel to have the inertia moment being approximately 100,000 gcm or more.

Next, an example of an image forming apparatus in which a belt-shaped photoreceptor is driven precisely by engaging a driving apparatus of an image carrying member will be explained with reference to a cross sectional construction view in FIG. 13.

Belt-shaped photoreceptor 10 used as a belt-shaped image carrier is a flexible photoreceptor belt trained about driving roller 11 and rotary rollers 12 and 13, and it is stretched tensely by an action of tension roller 14 to rotate clockwise while touching partially backup member 40 provided on its internal circumferential surface. In the belt-shaped photoreceptor 10, a thin film of metal such as tin oxide, lead oxide or indium oxide is provided as a conductive layer on a flexible base body such as polyester, polyimide, or polyethyleneterephthalate and the upper surface of the conductive layer is coated with an organic photoconductor layer (OPC) and the conductive layer is grounded. In the belt-shaped photoreceptor 10 in the present embodiment, OPC is coated on an 80 $\mu$m-thick base body of polyethyleneterephthalate to be controlled accurately so that the total thickness of 100 $\mu$m may be kept constantly.

On the side of the stretched belt-shaped photoreceptor 10, there are provided four sets of image forming means each being composed of charging means, imagewise exposure means and developing device.

Scorotron charging devices 21(Y), 21(M), 21(C) and 21(K) each representing a charging means are used for image forming processes for colors of yellow (Y), magenta (M), cyan (C) and black (K), and they electrically charge organic photoconductor layers of belt-shaped photoreceptor 10 with control grids kept at prescribed voltage and with corona discharge by discharge wires, thus, uniform voltage is given to the belt-shaped photoreceptor 10.

Each of imagewise exposure systems 22(Y), 22(M), 22(C) and 22(K) having an exposure optical system representing an imagewise exposure means makes a laser beam emitted from a semiconductor laser to be rotated for scanning by a polygon mirror rotated by a driving motor and conducts imagewise exposure for belt-shaped photoreceptor 10 through fθ lens. The imagewise exposure is conducted when image signals of each color read by a separate image reading device are subjected to image processing and then are inputted as electric signals in each of the imagewise exposure systems 22(Y), 22(M), 22(C) and 22(K).

Developing devices 23(Y), 23(M), 23(C) and 23(K) each housing one-component or two-component developing agents for each of yellow (Y), magenta (M), cyan (C) and black (K) representing a developing device employing a non-contact developing method are arranged vertically at one side of belt-shaped photoreceptor 10 arranged vertically to be positioned in parallel with the belt surface in a way that each of the developing devices is perpendicular to the moving direction of the belt-shaped photoreceptor 10, and each of them is provided with developing sleeve 231(Y), 231(M), 231(C) and 231(K) (only a part of them is illustrated) which rotates in the same direction while keeping a prescribed distance from the circumferential surface of the belt-shaped photoreceptor 10 through a means explained later.

The developing devices 23(Y), 23(M), 23(C) and 23(K) develop reversely the electrostatic latent images on the belt-shaped photoreceptor 10 formed through charging by scorotron charging devices 21(Y), 21(M), 21(C) and 21(K) and imagewise exposure by imagewise exposure systems 22(Y), 22(M), 22(C) and 22(K) with impression of developing bias voltage under the non-contact condition.

Upon the start of image recording, a driving motor revolves to rotate belt-shaped photoreceptor 10 clockwise through driving roller 11, and scorotron charging device 21(Y) starts supplying voltage to the belt-shaped photoreceptor 10 through its charging action. After being supplied with voltage, the belt-shaped photoreceptor 10 starts to be subjected to exposure by electric signals corresponding to the first color signals, namely, to image signals for yellow (Y) at imagewise exposure system 22(Y), whereby an electrostatic latent image corresponding to a yellow (Y) image is formed on the photoreceptor layer on the surface of the belt through its rotation (sub-scanning). This latent image is subjected to reversal development conducted by developing device 23(Y) under the condition that developing agents stuck to and carried by developing sleeve 231(Y) are on the non-contact basis, thus a toner image for yellow (Y) is formed when the belt-shaped photoreceptor 10 rotates.

Then, voltage is supplied on the toner image for yellow (Y) on the belt-shaped photoreceptor 10 by scorotron charging device 21(M) through its charging action, and exposure by electric signals corresponding to the second color signals of imagewise exposure system 22(M), namely, to image signals for magenta (M) is given, thus, a toner image for magenta (M) is formed, through non-contact reversal development conducted by developing device 23(M), to be superposed on the toner image for yellow (Y).

Through the same process, a toner image for cyan (C) corresponding to the third color signals is further formed by scorotron charging device 21(C), imagewise exposure system 22(C) and developing device 23(C) to be superposed, and a toner image for black (K) corresponding to the fourth color signals is further formed by scorotron charging device 21(K), imagewise exposure system 22(K) and developing device 23(K) to be superposed, thus, color toner images are formed on the circumferential surface of the belt-shaped photoreceptor 10 when it makes one turn.

Developing agent for replenishment for each color is supplied to each of developing devices 23(Y), 23(M), 23(C) and 23(K) by each of toner replenishing tanks 24(Y), 24(M), 24(C) and 24(K). For developing operation conducted by each of developing devices 23(Y), 23(M), 23(C) and 23(K), DC development bias or development bias of DC plus AC is impressed on each developing sleeve 231(Y), 231(M), 231(C) and 231(K), and jumping development by means of one-component developing agents or two-component developing agents sticking to the developing sleeve 231 is conducted, thus there is conducted non-contact reversal development for the belt-shaped photoreceptor 10 whose conductive layer is grounded wherein a toner image is made to stick to an exposure section on a photoreceptor from the developing sleeve 231 on which DC bias having the same polarity as that of electric charges on the belt-shaped photoreceptor 10 is impressed.

The color toner image thus formed on the circumferential surface of the belt-shaped photoreceptor 10 is neutralized by pre-transfer exposure unit 25 after being uniformed in terms of voltage of sticking toner by scorotron charging device 21(F), and then is transferred at a transfer section onto a transfer sheet which is fed out from cassette 31A, 31B representing a sheet feeding unit or from manual feeding section 32, then conveyed to timing roller 33 and is conveyed while being synchronized with a toner image area on the belt-shaped photoreceptor 10 by the timing roller 33 by transfer roller 26 which is arranged to face the lower portion of side roller 11 for driving the belt-shaped photoreceptor 10.

The transfer sheet onto which the toner image has been transferred is conveyed, after being separated from the circumferential surface of the belt-shaped photoreceptor 10 which follows the curved surface of driving roller 11, to fixing device 34 where it is heated and pressed, whereby toner is fused and fixed on the transfer sheet, and then is ejected out of the fixing device 34 and conveyed by sheet ejection and conveyance rollers 35A, 35B and 35C to be delivered onto sheet delivery section 36 provided at the upper portion with a toner image surface on the transfer sheet facing downward.

On the other hand, the surface of the belt-shaped photoreceptor 10 from which the transfer sheet has been separated is scraped by cleaning blade 271 in cleaning device 27 so that residual toner is removed and cleaned, and the belt-shaped photoreceptor 10 is either ready for succeeding toner image forming for the following document image or is stopped momentarily to be on standby. Incidentally, in the case of succeeding toner image forming for the following document image, the photoreceptor surface of the belt-shaped photoreceptor 10 is subjected to exposure conducted by pre-charging exposure device 28 so that hysteresis is removed.

In the color image forming apparatus of the present embodiment, development clearance Dsd formed between the photoreceptor surface of the belt-shaped photoreceptor 10 and developing sleeve 231 for each color can be maintained at an established clearance of 500 to 600 $\mu$m which is suitable for non-contact development for the total length of developing sleeve 231 within a highly accurate fluctuation range of not more than ±20 $\mu$m. This has been achieved by the study of inventors of the invention after confirming that the established development clearance Dsd maintained within the fluctuation range in the aforesaid accuracy makes it possible to develop excellent toner images having no unevenness.

Figure 13:
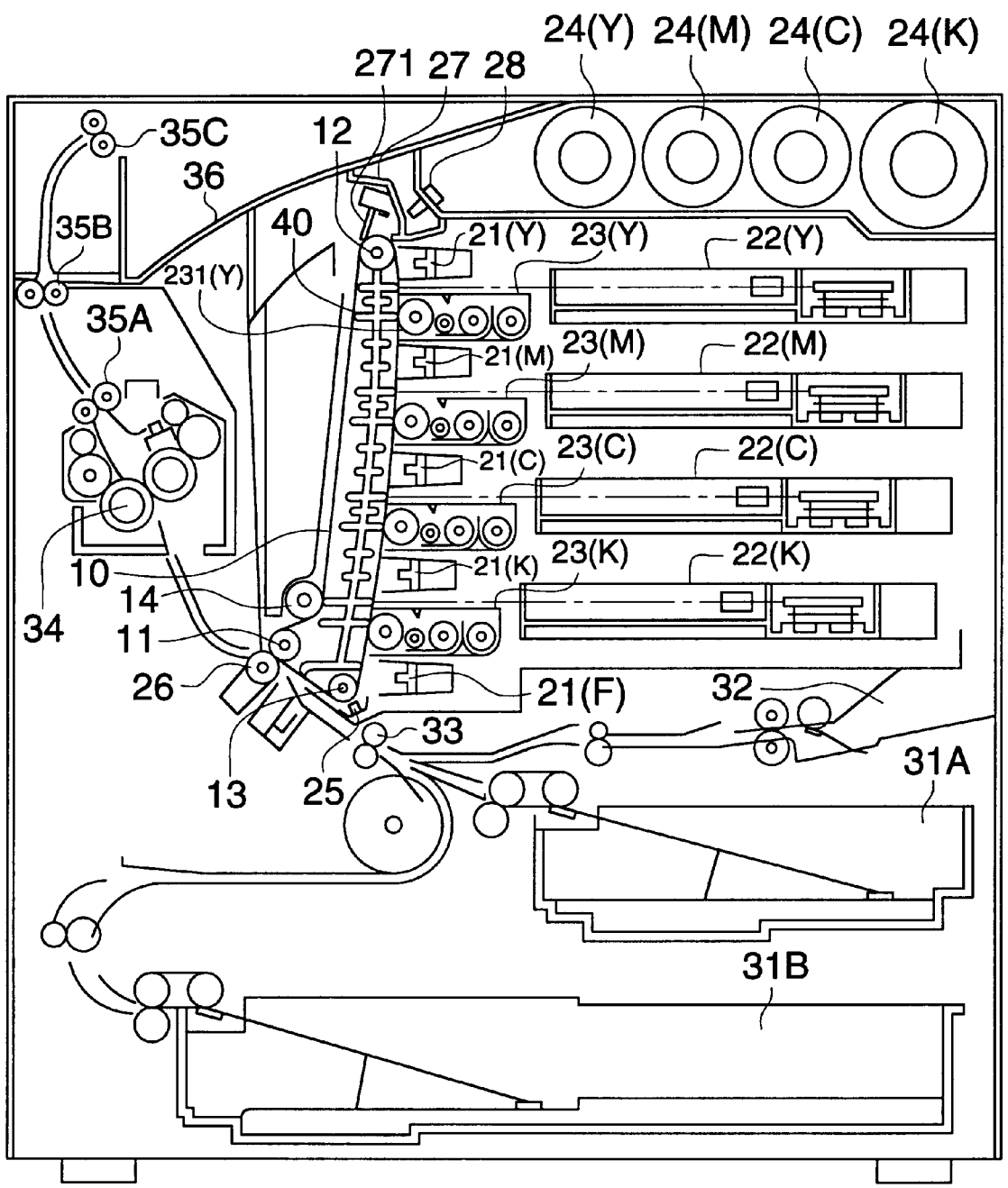
FIG. 13 is a sectional structure diagram of an image forming apparatus showing an embodiment of the invention.
Figure 14:
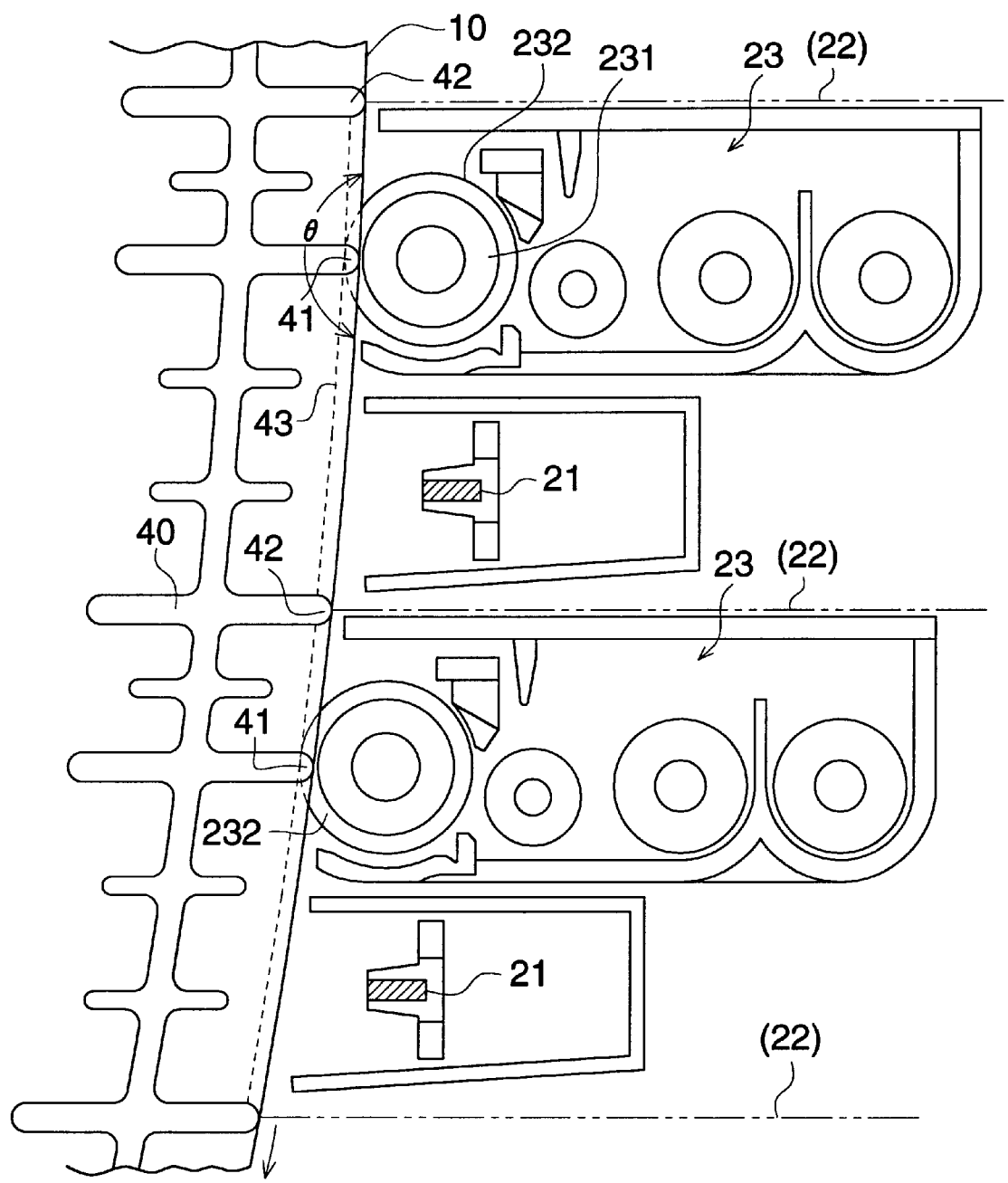
FIG. 14 is a perspective view showing a layout of each component in the aforesaid apparatus.

In FIG. 14, each of sectional views of developing sdevice 23 arranged to face belt-shaped photoreceptor 10 shown in FIG. 13 is enlarged. On backup member 40 representing a stopper supporting member provided inside the belt-shaped photoreceptor 10, there is provided semi-cylindrical contact supporting section 41 (Y, M, C, K) which faces at least developing sleeve 231(Y), 231(M), 231(C) and 231(K) and is protruded to be in a fin shape and has a radius of 1.5 mm on its tip. Each contact supporting section is provided so that it touches the back side of the belt-shaped photoreceptor 10 in the direction perpendicular to the rotational direction of the belt-shaped photoreceptor 10. Further, in the color image forming apparatus of the present embodiment, on the back side of the belt-shaped photoreceptor 10 where a scanning beam from each of imagewise exposure systems 22(Y), 22(M), 22(C) and 22(K) conducts imagewise exposure on a photoreceptor layer on the belt-shaped photoreceptor 10, there is provided semi-cylindrical contact supporting section 42(Y), 42(M), 42(C) and 42(K) having a small radius similar to that in the aforesaid contact supporting section 41 for the purpose of preventing vibration or fluctuation caused in the course of rotation of the photoreceptor surface so that each contact supporting section touches in the direction perpendicular to the rotational direction of the belt-shaped photoreceptor 10. The belt-shaped photoreceptor 10 trained about rotary rollers 12 and 13 is given tension of a certain level on its one side by tension roller 9, and on the other side thereof where image forming is conducted, the back side of the belt-shaped photoreceptor 10 is touched at contact supporting sections 41(Y), 41(M), 41(C), 41(K), 42(Y), 42(M), 42(C) and 42(K) at eight places each corresponding to each color, and the belt-shaped photoreceptor 10 is rotated clockwise at constant speed by driving roller 7 which rotates at constant speed with a large winding angle.

The belt-shaped photoreceptor 10 located on the side where image forming is conducted is stretched to be almost a plane by the tension between each pair of two contact places among eight contact places, and angle $\theta$ formed between the plane on the upstream side and the plane on the downstream side both of the belt stretched to both sides of the contact supporting section 41 is preferably set to be in the range of 175°–179°. Since contact of the contact sup-porting sections 41 and 42 with the back side of the belt-shaped photoreceptor 10 acts as frictional resistance, it is structured so that the contact supporting sections 41 and 42 touch the back side of the belt-shaped photoreceptor 10 through a semi-cylindrical section having preferably a radius on a section ranging from 1 mm to 3 mm, thus, an area of contact with the back side of the belt is reduced, and thereby frictional resistance in the course of rotation of the belt is reduced. When the angle $\theta$ formed between the plane on the upstream side and the plane on the downstream side both of the belt stretched to both sides of the contact supporting section 41 is small, namely when the belt-shaped photoreceptor 10 is greatly bent to rotate, the resistance in rotation at the contact point is great, which is not preferable. Angle $\theta$ at each of the above eight portions is near the anlge of 180° and is set as bing an angle with which the back surface of the belt-shaped photoreceptor 10 is not raised up above the contact supporting section 41. Further, the condition is set by the tension roller 14 so as not to cause tension and a raised-up portion.

Resistance in the course of rotation of the belt-shaped photoreceptor 10 is reduced as stated above and a slip between driving roller 11 and the belt-shaped photoreceptor 10 at their contact point is eliminated to achieve an arrangement wherein the belt-shaped photoreceptor 10 rotates at constant speed and no shear is caused on superposed toner images.

In the color image forming apparatus as explained above, the driving roller 11, the rotating rollers 12, 13, the tension roller 14 and the back-up member 40 which support the belt-shaped photoreceptor 10 are incorporated in a belt cartridge frame 100A to form a belt cartridge 100 capable being drawn out toward the front side In FIG. 13. In the condition that the belt cartridge 100 is mounted in the main body of the color image forming apparatus, a roller shaft 111 of the driving roller 11 is engaged with the image carrying member driving apparatus 50, and speed irregularities of the rotation by the driving motor M is reduced thereby conducting the driving with high accuracy.

Figure 1:
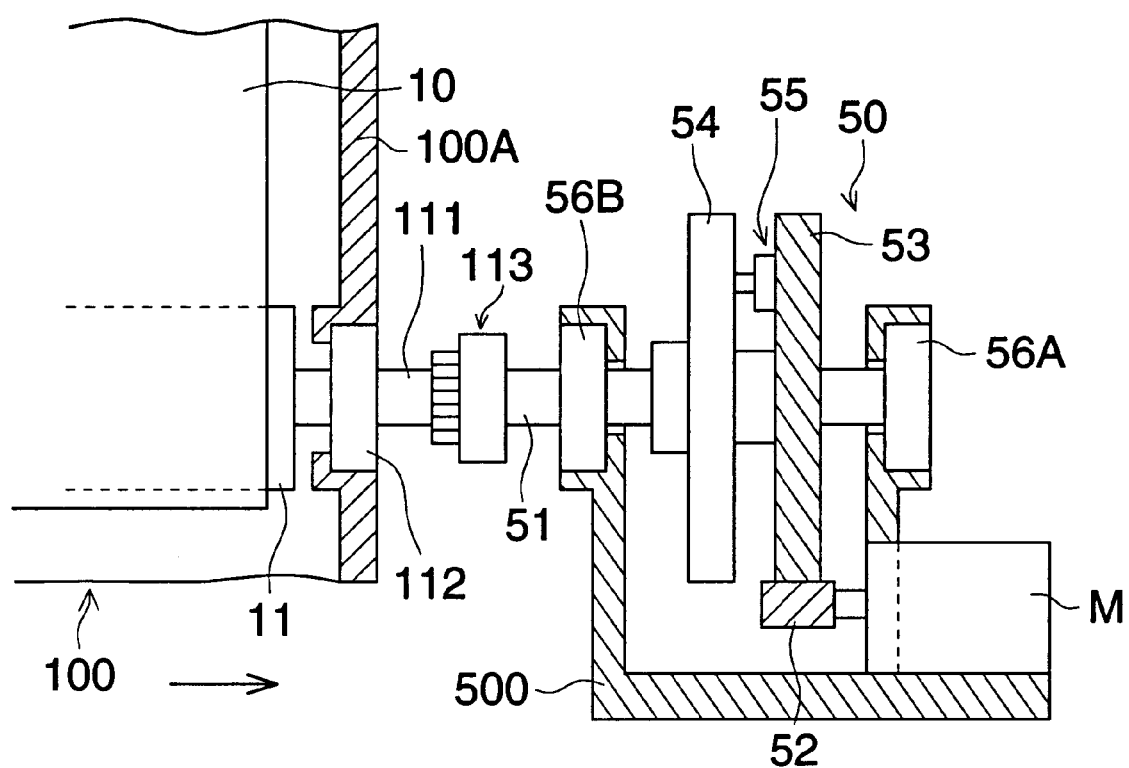
FIG. 1 shows a sectional view showing a rotational body driving mechanism.

FIG. 1 shows an embodiment of the driving apparatus 50 to be engaged with the belt-shaped photoreceptor driving roller 11.

The driving apparatus 50 is fixed to the main body of the color image forming apparatus by a driving frame 500 in which a driving motor M and two sets of driving bearings 56A and 56B to support a rotating driving shaft 51 are installed. A motor gear 52 directly connected to the driving motor M such as a pulse motor engages with the driving gear 53 mountd rotatably on the driving shaft 51, whereby the rotation is transmitted from the driving motor M to the driving gear 53.

The driving power of the driving gear 53 is further transmitted through a drive transmitting section 55 explained later on to the flywheel 54 which has an end face opposite to the driving gear 53 and is fixed to the driving shaft 51. Although the driving shaft 51 is connected with the flywheel as a single body, since the driving shaft 51 is not connected with the driving gear 53, the driving shaft can rotate as a separate body from the driving gear 53. Accordingly, the driving power of the driving gear 53 is not transmitted through the driving shaft 51 and is transmitted through the drive transmitting section 55.

With above structure, the speed irregularities transmitted to the flyweel 54 is reduced by the reducing effect of the drive transmitting section 55 and the inertia of the flywheel 54.

Figure 2:
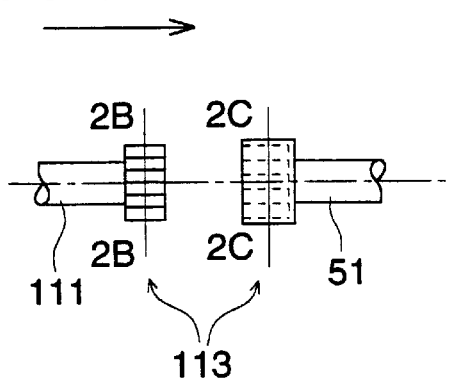
Figure 2:
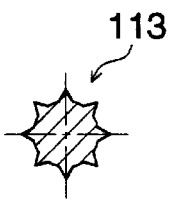
Figure 2:
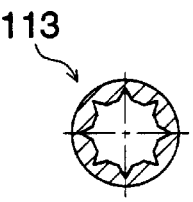

When the belt cartridge 100 is mounted in the main body of the apparatus, a roller shaft 111 of the belt-shaped photoreceptor driving roller 11 supported by a roller bearing 112 of the belt cartridge frame is connected with the driving shaft 51 by the engagement between the driving shaft 51 and the coupling member 113. Whereby the rotation of the driving shaft 51 from which the speed irregularities are reduced is transmitted to the driving roller 11 and the belt-shaped photoreceptor 10 is rotated with less speed irregularities. Incidentally, FIG. 2 shows an example of the coupling member 113. A member with which the rotation can be transmitted on the condition that there may be no exessive play and no eccentricity on the engaging condition capable of being engaged or disengaged may be used as the coupling member.

Further, in the embodiment shown in FIG. 1, the driving apparatus 50 is installed in the main body of the color image forming apparatus and is engaged by the coupling member 11 when the belt cartridge 100 is mounted, whereby the rotation of the driving apparatus 50 is transmitted. However, the present invention is not limitted to the above embodiment. It may be possible to install the driving apparatus 50 directly in the belt cartridge frame 100A. In this embodiment, it is not necessary to use the coupling member 113.

Figure 3A:
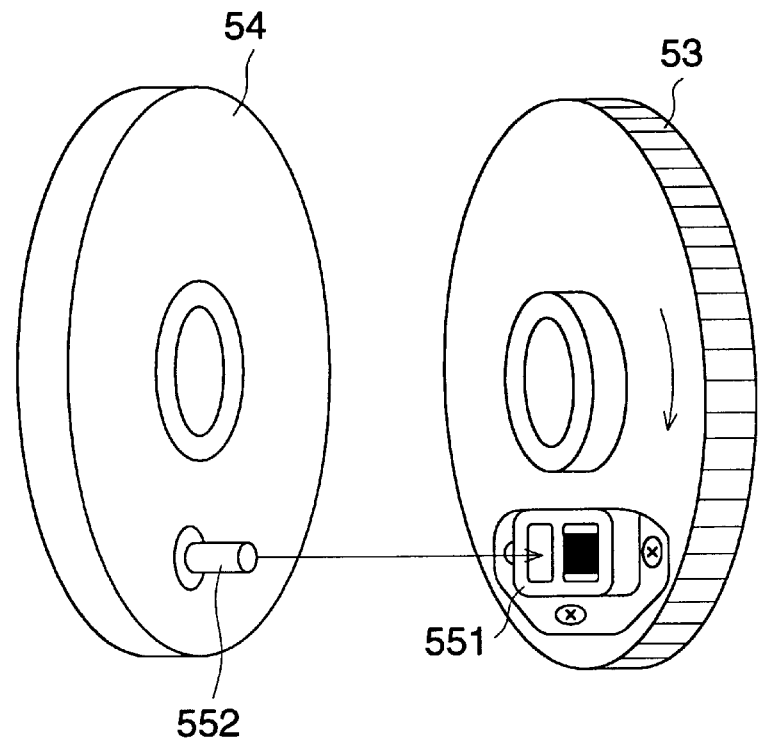
FIGS. 3(a), 3(b) and 3(c) are explanatory views showing an example of a drive-transmitting section related to the invention.
Figures 3B, 3C:
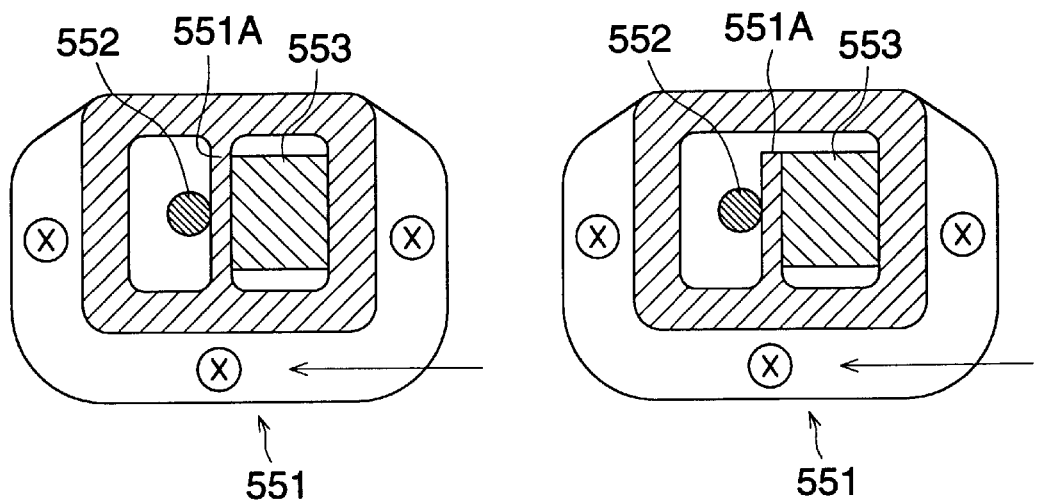

FIG. 3(*a*) is an exploded perspective view showing constitution of an embodiment of drive transmitting section 55. In the drive transmitting section 55 which conducts drive transmission between the driving gear 53 and the flywheel 54, beam-shaped elastic body 551 having beam section 551A is provided on the end face of the driving gear 53, beam section 551A is provided to be fixed at the position which is almost in the direction of a radius of driving gear 55, and drive linking protrusion 552 which is bar-shaped and rigid is fixed on an end face of the flywheel 54. In the assembled state, the drive linking protrusion 552 is in contact with the position which is almost the center of the beam section 551A of the beam-shaped elastic body 551 as shown in FIG. 3(*b*), and the drive linking protrusion 552 is pushed in the arrowed direction through the beam section 551A as the driving gear 53 rotates, thus, drive transmission to the belt-shaped photoreceptor 10 is carried out.

In the drive transmitting section 55, there is provided viscoelastic body 553 which comes in surface contact with a point on beam section 551A which is opposite to the point where the drive linking protrusion 552 touches the beam section 551A, while being deformed with a constant compressibility. In the invention, there are provided in the drive transmitting section a first elastic member (beam section 551A) which determines, through elastic deformation behavior, a natural frequency of a driving system composed of a rotational body and a driving source and a second elastic member (viscoelastic body 553) which acts on elastic behavior of the first elastic member and increases its attenuation characteristic, which will be explained in detail as follows.

The beam-shaped elastic body 551 in the present embodiment is a resin molding made of polyacetal (POM), and it is fixed firmly on the driving gear 53 by three screws, for example. The beam section 551A is a both-end supported beam which is fixed at its both ends and has a thickness of 1.8 mm and a length of 55 mm, and it determines natural frequency of the beam-shaped elastic body 551, there may be used selectively the elastic resin materials and metallic materials both for industrial use such as ABS resins (ABS), SUS alloys, zinc-coated steel plate (SECC-C-20/20) and aluminum alloys, in addition to those mentioned above. Further, the beam-shaped section may also be of a cantilever type shown in FIG. 3(*c*), though it is in a form of a both-end supported beam in the embodiment.

For viscoelastic body 553 in the present embodiment, there are used chloroprene rubber (CR), ethylenepropyrene rubber (EPDM), silicone gel, oil-impregnated porous rubber, butyl rubber, thermoplastic elastomer, and high-function material wherein high vibration absorbing capability is added to thermoplastic resin. The viscoelastic body 553 is an elastic body whose JIS rubber hardness is in a range from 20 degrees to 100 degrees, and preferably is in a range from 40 degrees to 80 degrees, and viscoelastic bodies preferably used represent one whose dynamic dissipation factor tan δ is 0.3 or more, and preferably is 0.5 or more. The viscoelastic body 553 having the characteristics mentioned above is in surface contact, under its condition to be compressed in advance with compressibility of 1%–15% as shown in FIG. 3(*b*), with a certain area on the beam section 551A that is opposite to the point where drive linking protrusion 552 touches the beam section 551A.

Figure 4:
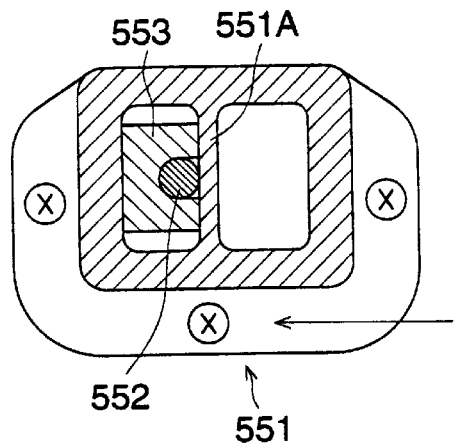
Figure 4:
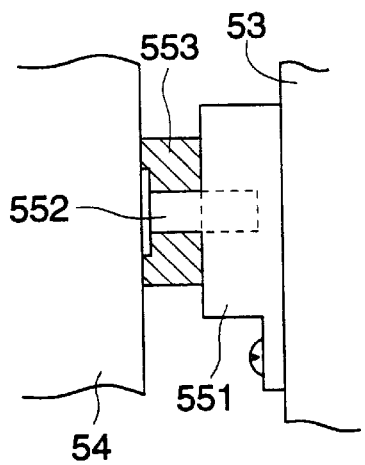
Figure 4:
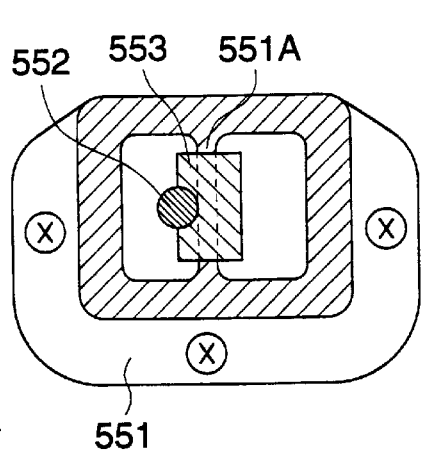
Figure 4:
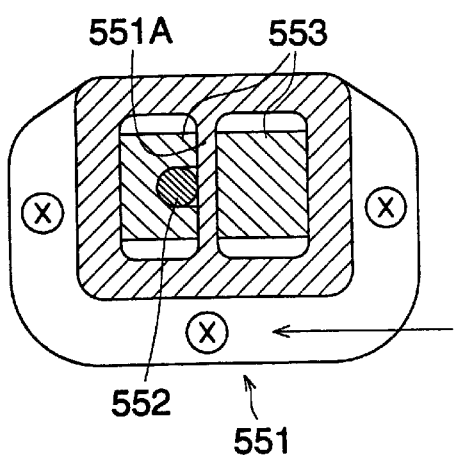
Figure 4:
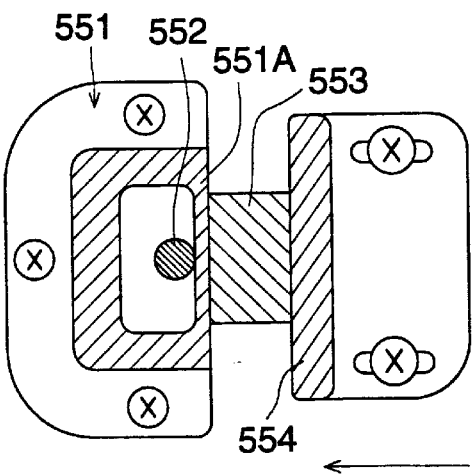

Due to the structure mentioned above, it is possible for the viscoelastic body 553 to control the attenuation coefficient extremely effectively and freely on a dominant basis. In the embodiment, the viscoelastic body 553 is in contact with a portion on the beam section 551A that is opposite to the point where the drive linking protrusion 552 touches the beam section 551A as shown in FIG. 3(*b*). However, it is also possible to arrange so that the viscoelastic body 553 comes in contact with a portion on the beam section 551A that is on the same side as the point where the drive linking protrusion 552 touches the beam section 551A as shown in FIG. 4(*a*). It is further possible to arrange so that the viscoelastic body 553 comes in contact with a side on the side where the drive linking protrusion 552 touches the beam section 551A as shown in FIG. 4(*b*). The position where the viscoelastic body 553 comes in contact with the beam section 551A is not limited to one point, but it is possible to arrange so that the viscoelastic body 553 comes in contact with the beam section 551A at two points one of which is the same as, and the other of which is opposite to a point where the drive linking protrusion 552 touches the beam section 551A as shown in FIG. 4(*c*), for example.

Though the viscoelastic body 553 which is compressed in advance by 1%–15% is brought into contact with beam section 551A, it is also possible to make an arrangement wherein pressing member 354 capable of adjusting finely the distance from beam section 551A is provided separately from the beam-shaped elastic body 551 as shown in FIG. 4(*d*), and the viscoelastic body 553 is set between them after obtaining appropriate compressibility of the viscoelastic body 553.

The inventors of the invention made an arrangement wherein viscoelastic body 553 made of material of CR rubber having rubber hardness of 61 degrees is used to be in contact with a reverse side of beam section 551A at compressibility of 10% with regard to belt-shaped photoreceptor 10 having moment of inertia of 27000 gcm$^2$ which is the sum of inertia moments of the flywheel 54 and the belt-shaped photoreceptor driving roller 11 and whereby lowered the natural frequency of the beam section 551A from 25 Hz to 15 Hz by making the viscoelastic body 553 to touch to make the reduction of gain of transfer coefficient possible.

FIGS. 5–10 represent data showing the conditions stated above.

Figure 5:
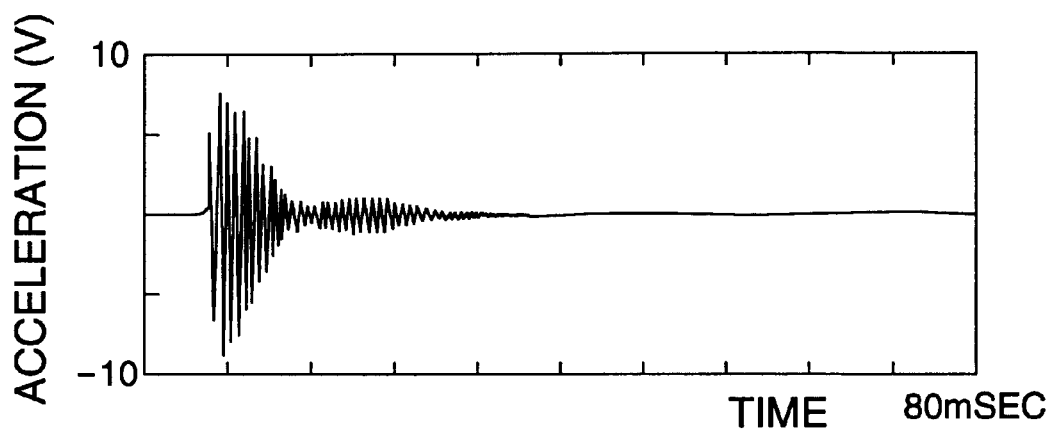
FIGS. 5(a) and 5(b) represent measurement data of acceleration response in the case of a beam alone.
Figure 5:
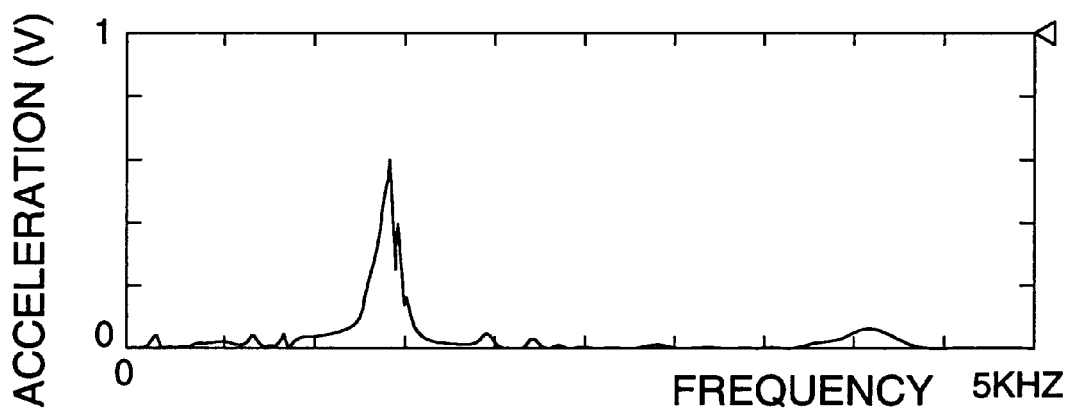

FIG. 5 represents data obtained through an arrangement wherein viscoelastic body 553 was removed, and a portion of a beam of beam section 551A was shaken and the acceleration response of the beam was measured, in which (a) shows data whose axis of abscissa represents time, while (b) shows data whose axis of abscissa represents frequency.

Figure 6:
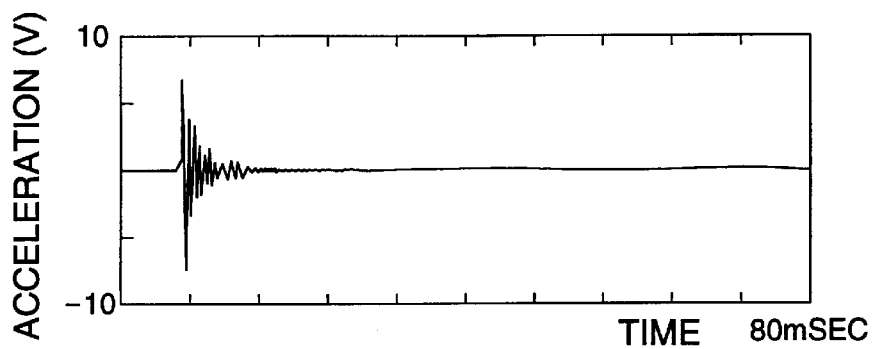
FIGS. 6(a) and 6(b) represent measurement data of acceleration response in the case where a viscoelastic body is added to a beam.
Figure 6:
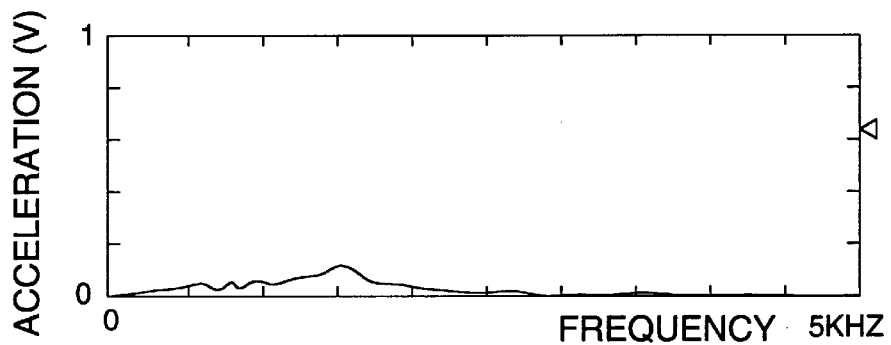

FIG. 6 shows data obtained through an arrangement wherein viscoelastic body 553 was attached on beam section 551A and a portion of the beam of the beam section 551A was shaken, in which (a) shows data whose axis of abscissa represents time, while (b) shows data whose axis of abscissa represents frequency. When FIG. 5 is compared with FIG. 6, it is observed that the gain of natural frequency is lowered in frequency area data by attachment of the viscoelastic body 553, while vibration is promptly attenuated in the time axis area data and thereby vibration characteristics are improved.

Figure 7:
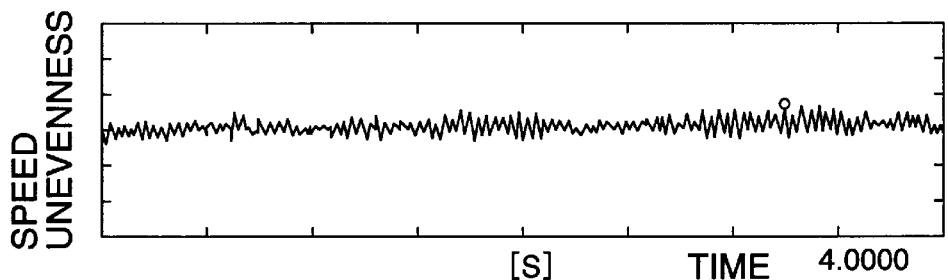
FIGS. 7(a) and 7(b) represent measurement data of speed unevenness of a photoreceptor drum in the case of a beam alone.
Figure 7:
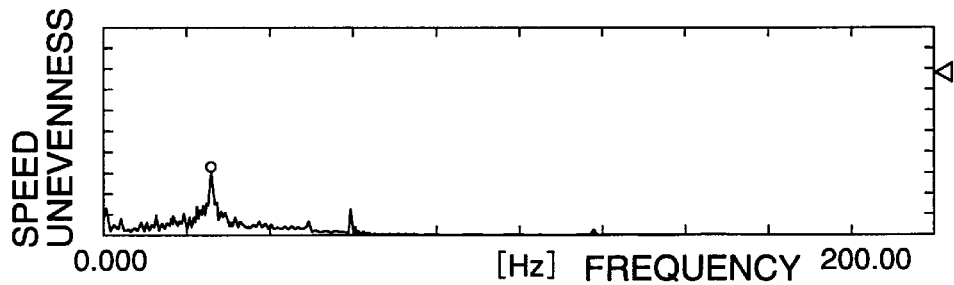

FIGS. 7–10 represent data obtained by measuring speed unevenness of the belt-shaped photoreceptor 10 by a laser Doppler after applying the foregoing actually on drive transmitting section 55 of an image forming apparatus. FIG. 7 represents data obtained by removing the viscoelastic body 553. In the actual driving system, there are various factors for load variation for the belt-shaped photoreceptor 10 and they are causing speed unevenness of the photoreceptor drum 10. Therefore, in the case of beam section 551A alone in FIG. 7, load variation affects adversely to make the gain in the vicinity of torsion natural frequency (approx. 25 Hz) to be great, and a p—p value of time axis area data is also great.

Figure 8:
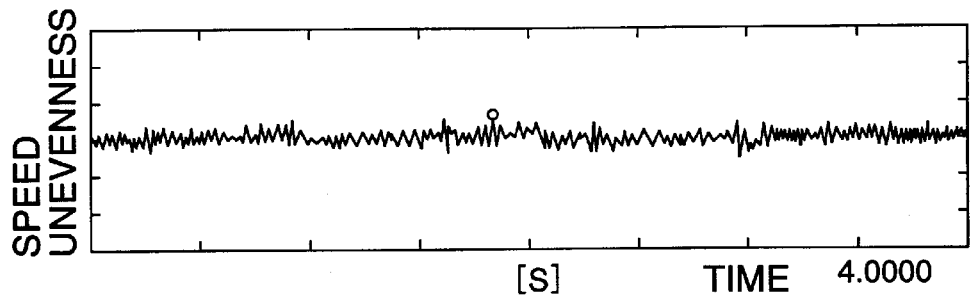
FIGS. 8(a) and 8(b) represent measurement data of speed unevenness of a photoreceptor drum in the case where a viscoelastic body is added to a beam section.
Figure 8:
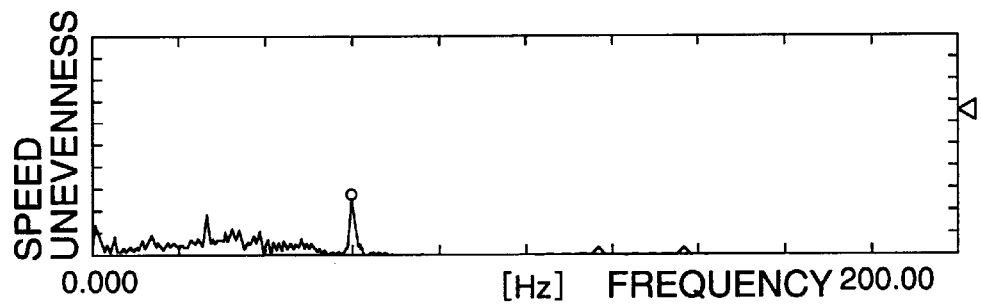

FIG. 8 represents data obtained through an arrangement where in viscoelastic body 553 was attached on beam section 551A. When FIG. 8 is compared with FIG. 7, it is understood that when the viscoelastic body 553 is attached, the gain of resonance in a frequency area is controlled to be low in spite of load variation, a p—p value of time axis area data is kept to be small stably, and driving accuracy is improved. Data shown in FIG. 9 represent those obtained through an arrangement wherein the sum of inertia moments of the flywheel 54 and the belt-shaped photoreceptor 10 was increased further by 12000 gcm$^2$ in addition to the condition in FIG. 8, and when FIG. 9 is compared with FIG. 8, it is understood that speed unevenness is further lowered.

Figure 9:
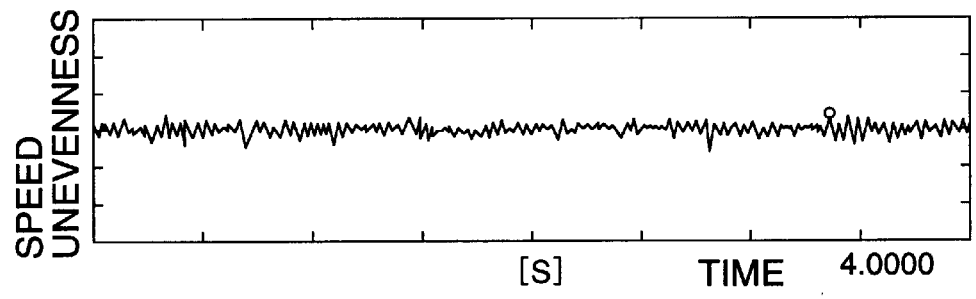
FIGS. 9(a) and 9(b) represent measurement data of speed fluctuation of a photoreceptor drum in the case where moment of inertia are added in addition to the viscoelastic body.
Figure 9:
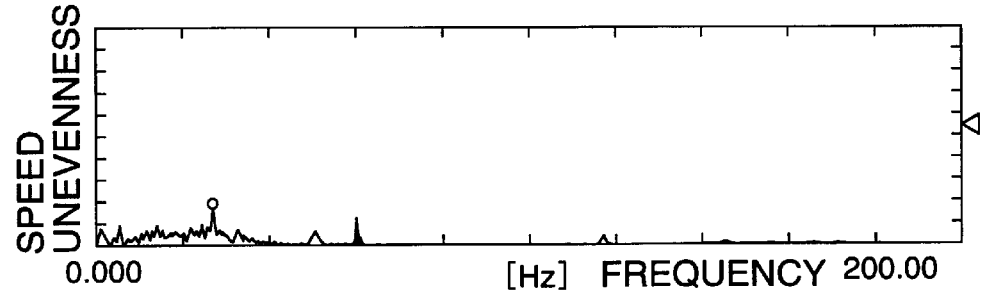
Figure 10:
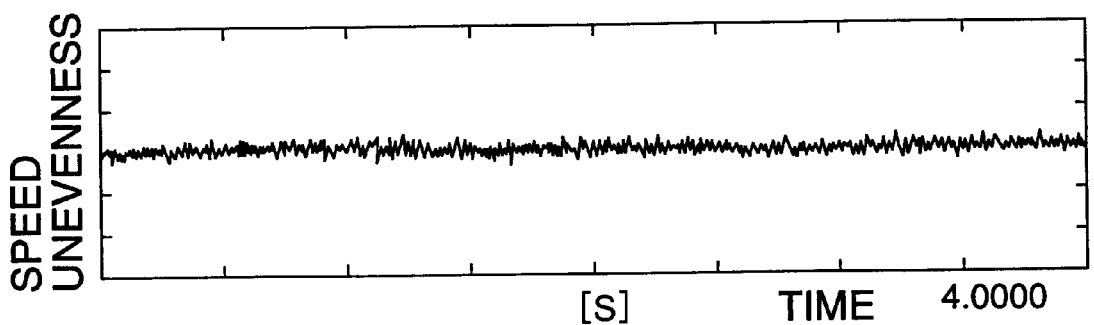
FIGS. 10(a) and 10(b) represent speed fluctuation data of a photoreceptor drum obtained in the case where a viscoelastic body is replaced under the condition in FIG. 9.
Figure 10:
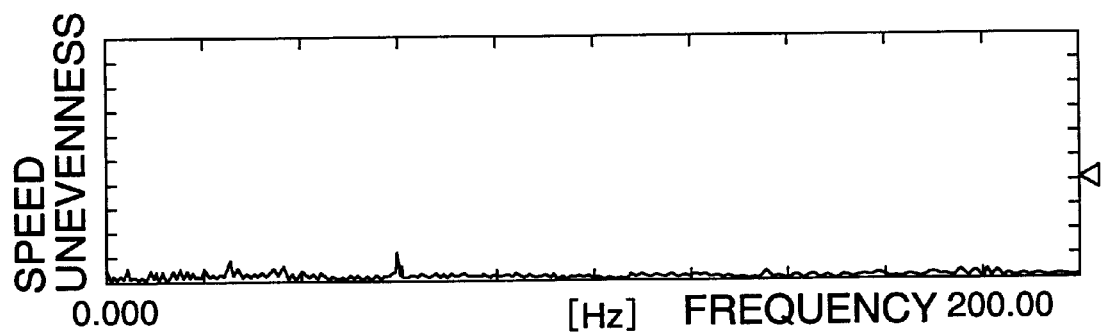

FIG. 10 shows data obtained in an arrangement wherein the viscoelastic body 553 employing CR rubber in FIG. 9 was replaced with viscoelastic body 553 employing thermoplastic elastomer having dissipation factor tan δ of 1.9 (manufacturer (Toso) ED 1920N). It is observed that the gain in the vicinity of 25 Hz is further lowered and speed evenness is improved by using the viscoelastic body whose dissipation factor is considerably great compared with that of CR rubber.

Figure 11:
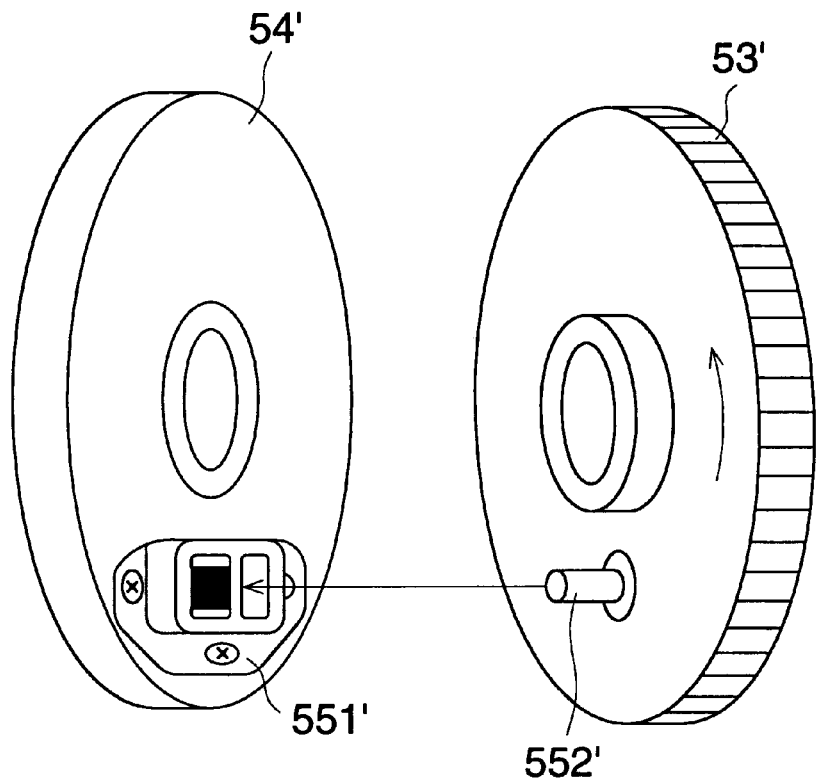
FIGS. 11(a) and 11(b) represent an illustration showing another embodiment of the drive-transmitting section related to the invention.
Figure 11:
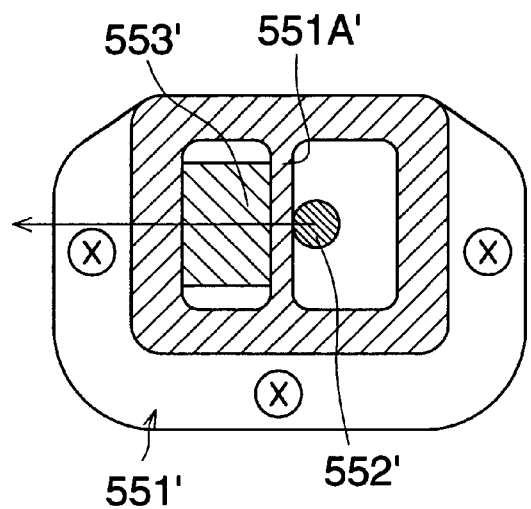

The drive transmitting section 55 in the embodiment explained above is of structure (see FIG. 3) wherein beam-shaped elastic body 551 is fixed on the end face of driving gear 53, drive linking protrusion 552 is fixed on the end face of the flywheel 54, beam section 551A of the beam-shaped elastic body 551 is brought into contact with the drive linking protrusion 552, and thereby rotation of the driving gear 53 is transmitted to the drive linking protrusion 552 through the beam section 551A. However, it is also possible to obtain the same effect through the structure which is utterly opposite to the foregoing. FIG. 11 shows the structure of drive transmitting section 55' in the present embodiment, and beam-shaped elastic body 551' having thereon beam section 551A' is provided on the end face of the flywheel 54', and the beam section 551A' is fixed to be almost in the direction of a radius of the flywheel 54' in terms of positional relation. On the beam section 551A', there is provided viscoelastic body 553' in a way that the viscoelastic body 553' is in contact with the beam section 551A'. On the end face of driving gear 34', there is fixed bar-shaped and rigid drive linking protrusion 552' which is in contact mostly with the central position of the beam section 551A' in the assembled state as shown in FIG. 11 (b) and it pushes the beam section 551A' in the arrowed direction as the driving gear 34' rotates, thus drive transmission to the belt-shaped photoreceptor driving roller 11 is carried out.

In the above embodiment, the image forming apparatus to conduct image formation by being connected with the image carrying member driving apparatus of the present invention as explained above is the belt-shaped photoreceptor rotated by the belt-shaped photoreceptor driving roller. However, the driving apparatus of the present invention can perform its supreme effect by being connected with the image forming apparatus in which a photoreceptor drum is used as a rotating member. In particular, in the case that the drum diameter of the photoreceptor drum is so small that its inertia moment is 10000 gcm$^2$ or less for example, by providing an appropriate inertia moment to the flywheel 54, speed irregularities can be remarkablly reduced.

The rotational body driving apparatus of the invention further offers an excellent effect even when it is applied to a recording apparatus for recording images on a light-sensitive film with a laser beam wherein, for example, a light-sensitive film is wound around a drum-shaped rotational body and is scanned by a polygon mirror while the rotational body is rotated at a constant speed.

Due to the invention, natural frequency in torsion of a rotational body can be controlled freely and dominantly by the first elastic member (beam section), and an attenuation coefficient can be controlled freely and dominantly by the second elastic member (viscoelastic body), which improves markedly the degree of freedom in designing. Both a natural frequency of a rotational body driving system and an attenuation coefficient which can be set freely result in a concrete effect that speed fluctuation is lowered because of a gain of the transfer function which is in an area where the gain is originally lowered, in the area of the frequency higher than the natural frequency and the gain of the transfer function itself is lowered by the effect of an attenuation member, and thereby result in an effect that a resonance level in the vicinity of the natural frequency is lowered, which makes it possible to obtain an effect that speed fluctuation related to driving of a rotational body is wholly lowered efficiently and accuracy of driving a rotational body is markedly improved. Further, in the present invention, the flywheel is provided in the system of the driving apparatu, thereby setting the inertia moment properly so as to enhance the effect of the present invention.

As a result, there is obtained a stable driving system which is highly resistant against speed fluctuation in the vicinity of a resonance area, vibration from a driving section for development in the case of an image forming apparatus, and against external disturbances such as variations of loads including a blade and a transfer roller.

Since the invention makes an influence of load variation and speed fluctuation to be extremely small, a belt-shaped photoreceptor rotated by the driveing roller and a photoreceptor drum on which an image is formed can constantly be rotated highly accurately and stably.

As a result, in an image forming apparatus being connected with the driving apparatus of the present invention, small pich banding which is a primary image trouble caused by speed fluctuation of a photoreceptor is made small extremely, and images with high image quality can be provided stably by making the small pich banding to be at a level which can not be recognized by human eyes.

What is claimed is:

1. A driving apparatus to transmit driving power to an image carrying member in an image forming apparatus, comprising:

a driving gear to output the driving power and having a first end face;

a flywheel coupled with the image carrying member and having a second end face opposite to the first end face of the driving gear;

a rigid protrusion fixed on one of the first end face and the second end face; and an elastic member fixed on the other one of the first end face and the second end face, the elastic member shaped so as to engage with the rigid protrusion so that the driving power is transmitted from the driving gear to the image carrying member through the engaging portion between the rigid protrusion and the elastic member, the elastic member comprising a first member, provided in contact with the rigid protrusion at the engaging portion, for elastically deforming itself so as to control a natural frequency value of a driving system including said rotating body; and a second member for controlling damping characteristics of said driving system.

2. The driving apparatus of claim 1, wherein the sum of the inertia moment of the image carrying member and the inertia moment of the flywheel is 10,000 g.cm$^2$ to 30,000 g.cm$^2$.

3. The driving apparatus of claim 1, wherein the image carrying member is one of a photoreceptor drum and a belt-shaped photoreceptor driving gear.

4. The driving apparatus of claim 1, wherein the first elastic member comprises a beam section having a first side and a second side opposite to the first side, and wherein the rigid protrusion comes in contact with the first side of the beam section and the second elastic member comes in contact with the second side of the beam section.

5. The driving apparatus of claim 1, where in the first elastic member comprises a beam section having a first side and a third side not opposite to the first side, and wherein the rigid protrusion comes in contact with the first side of the beam section and the second elastic member comes in contact with the third side of the beam section.

6. The driving apparatus of claim 1, wherein the first elastic member comprises a beam section having a first side, and wherein the rigid protrusion comes in contact with the first side of the beam section and the second elastic member also comes in contact with the first side of the beam section.

7. The driving apparatus of claim 1, wherein the second elastic member is a viscoelastic member which comes in surface contact with the first elastic member while being deformed with a predetermined compressibility.

8. The driving apparatus of claim 7, wherein the viscoelastic member has JIS rubber hardness of 20 degrees to 100 degrees.

9. The driving apparatus of claim 7, wherein the viscoelastic member has dynamic dissipation factor tan δ of 0.3 or more.

10. The driving apparatus of claim 7, wherein the second elastic member comes in contact with the first elastic member on the condition that the second elastic member is initially compressed by a compression rate of 1% to 15%.

* * * * *